Dec. 24, 1940.   D. LA FERNEY   2,226,475
NUT CRACKING MACHINE
Filed May 18, 1938    6 Sheets-Sheet 1
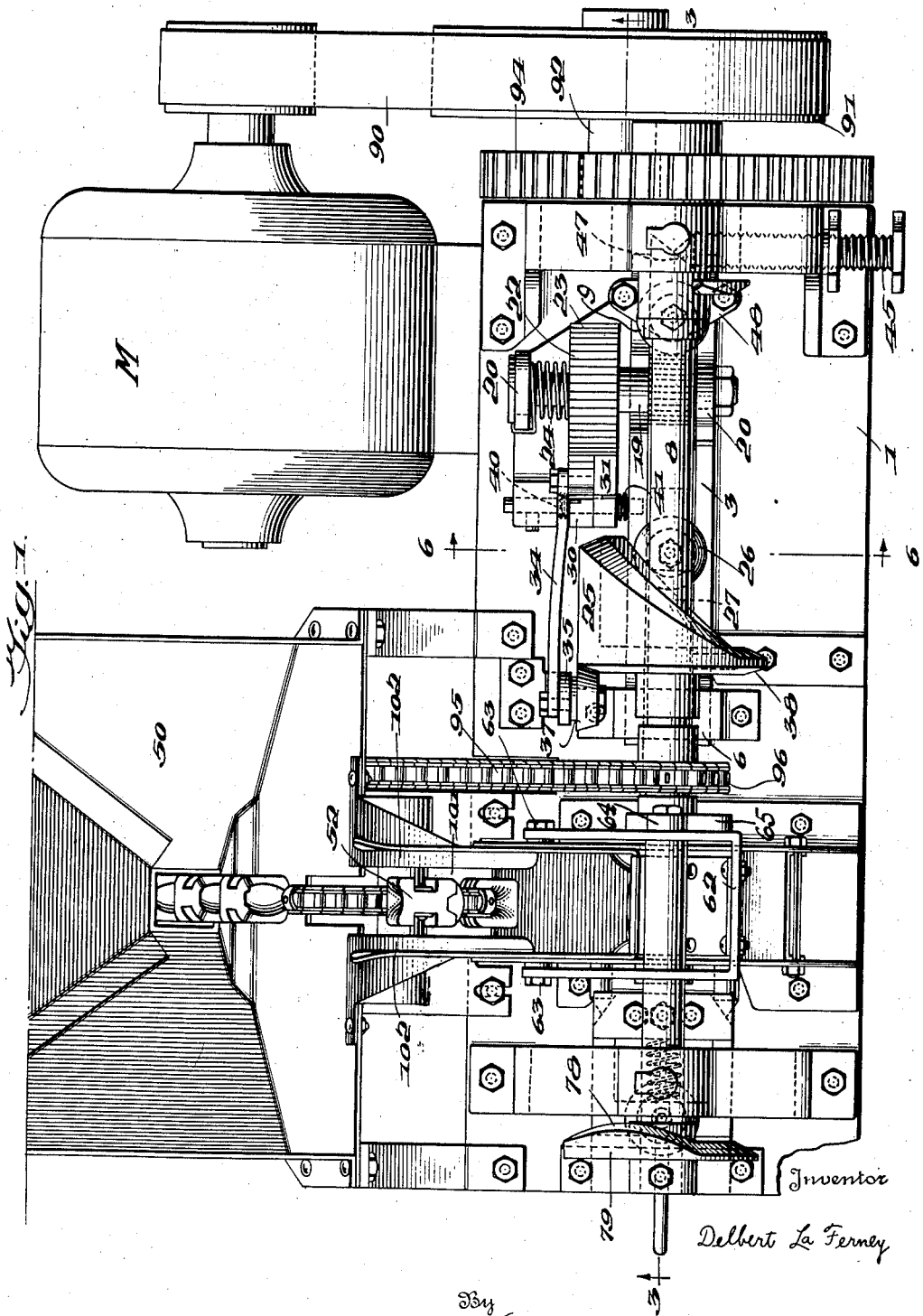
Inventor
Delbert La Ferney
By
Vernon E. Hodges
H. Hamlin Hodges  his Attorneys

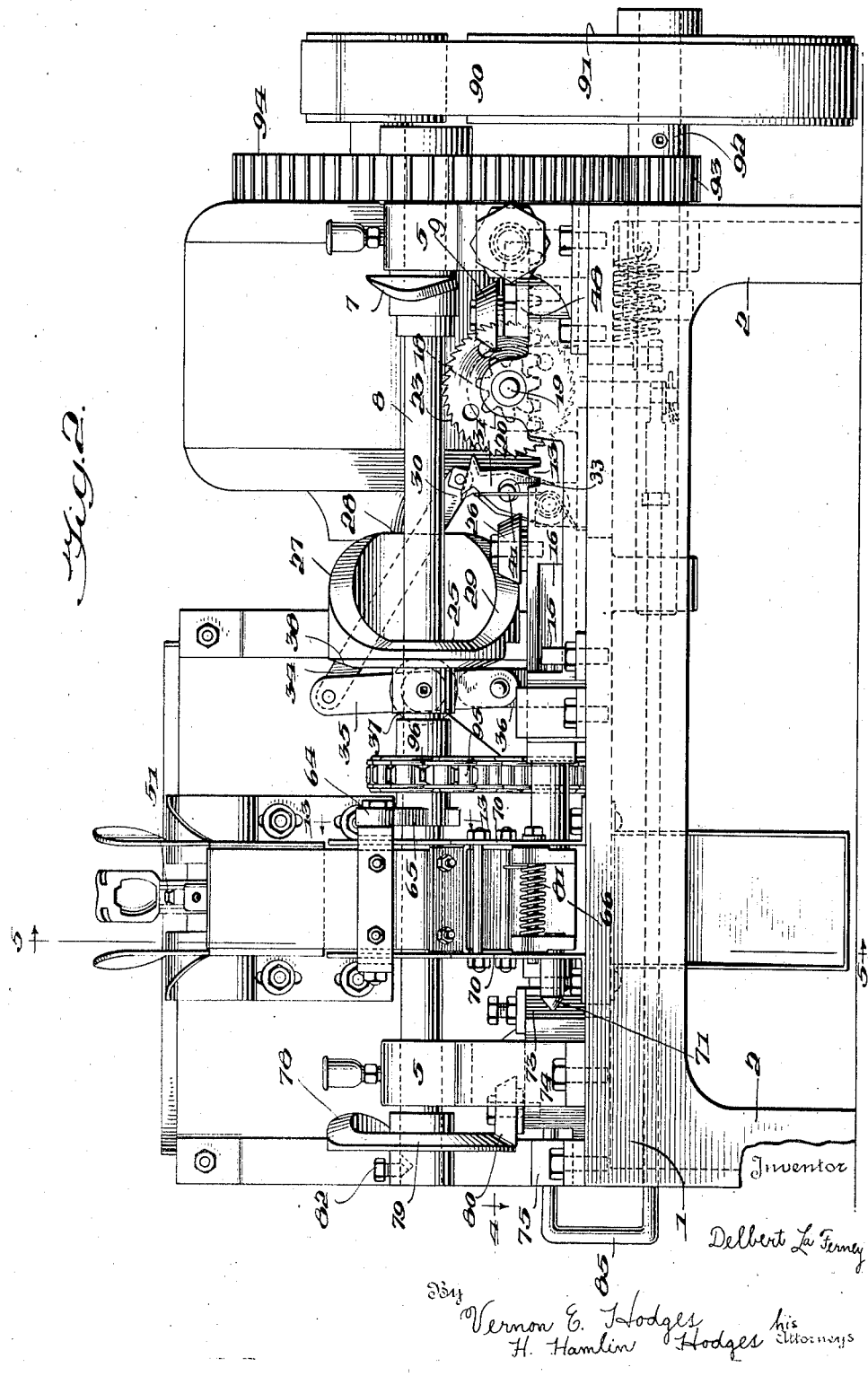

Dec. 24, 1940.  D. LA FERNEY  2,226,475
NUT CRACKING MACHINE
Filed May 18, 1938  6 Sheets-Sheet 3
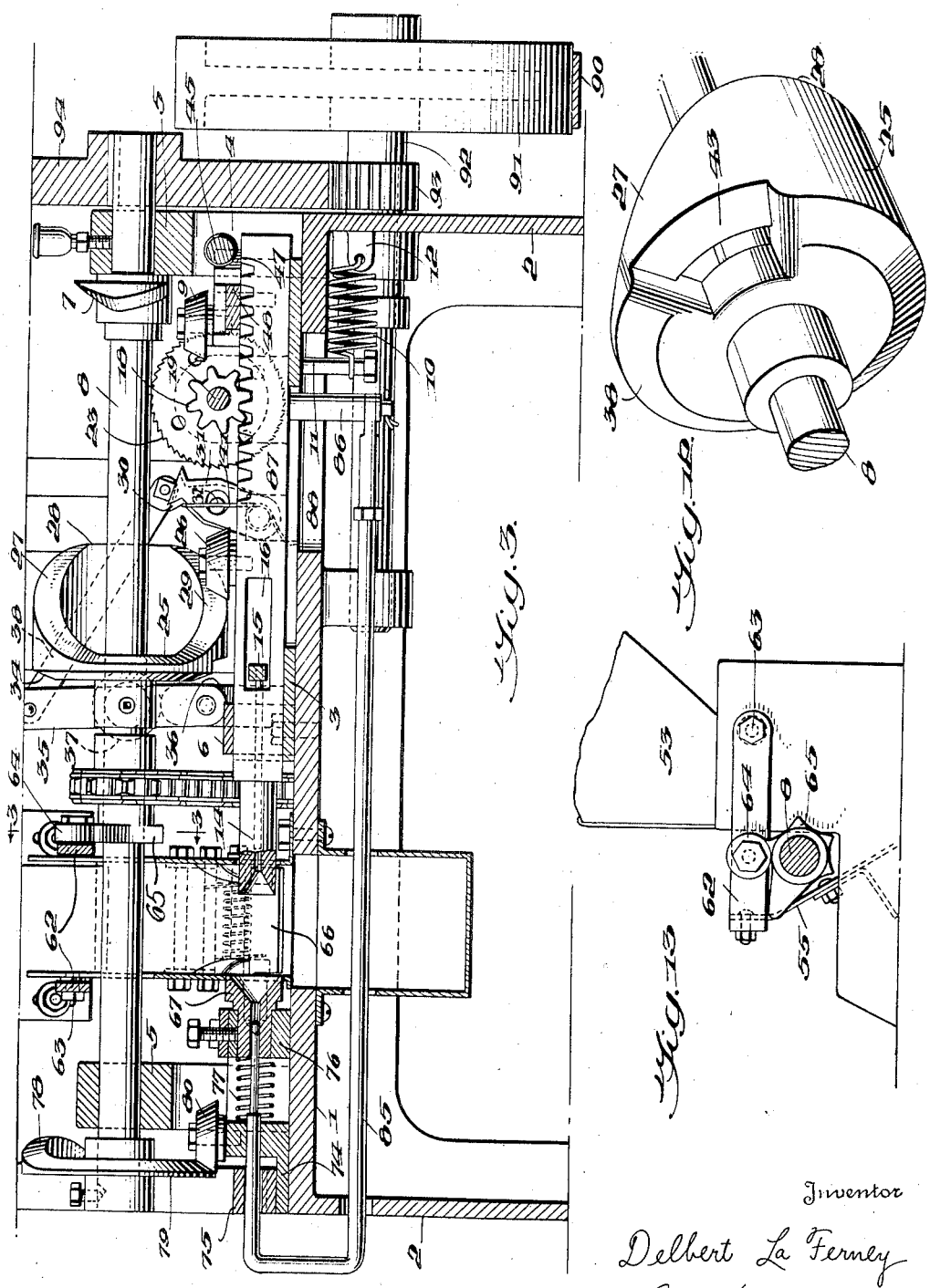
Inventor
Delbert La Ferney
By Vernon E. Hodges
H. Hamlin Hodges his Attorneys Dec. 24, 1940.   D. LA FERNEY   2,226,475
NUT CRACKING MACHINE
Filed May 18, 1938   6 Sheets-Sheet 4
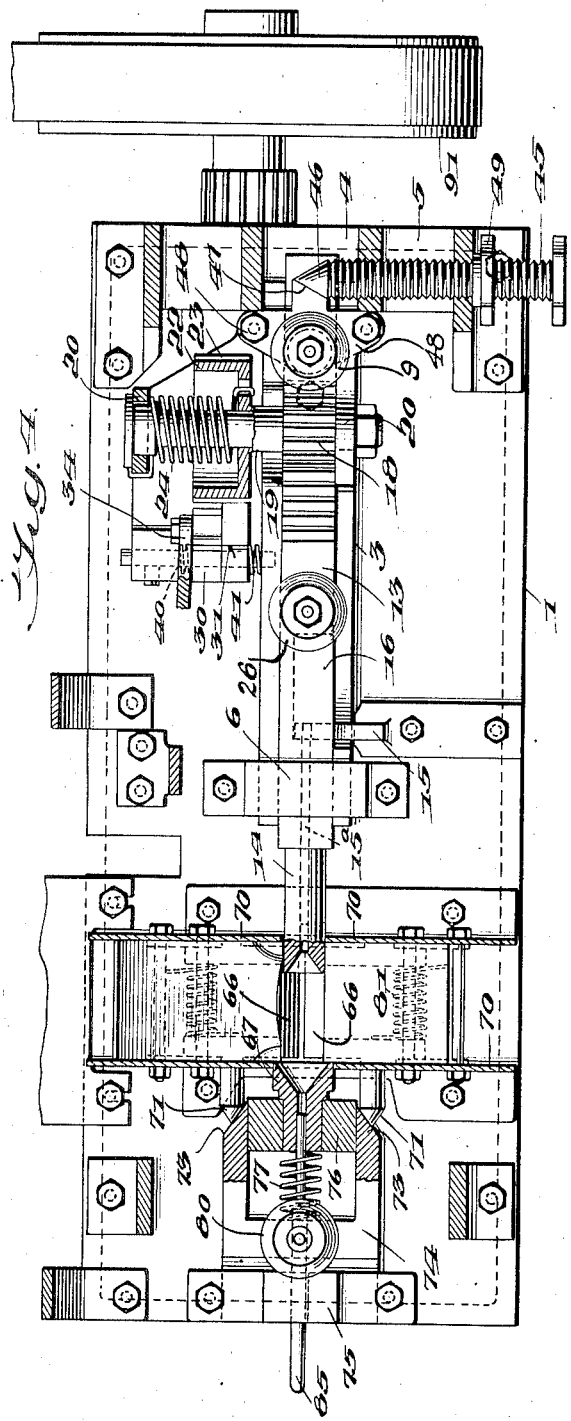
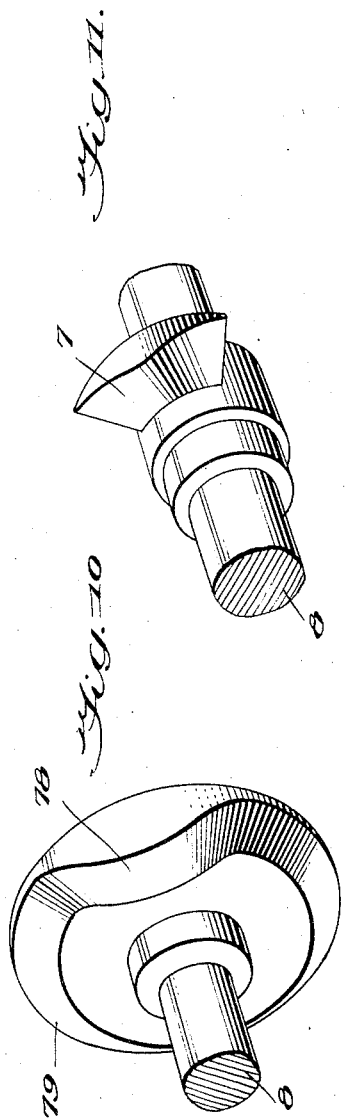
Inventor
Delbert La Ferney
By Vernon E. Hodges
H. Hamlin Hodges   his Attorneys Dec. 24, 1940.   D. LA FERNEY   2,226,475
NUT CRACKING MACHINE
Filed May 18, 1938   6 Sheets-Sheet 5

Inventor
Delbert La Ferney
By Vernon E. Hodges
H. Hamlin Hodges  his Attorneys

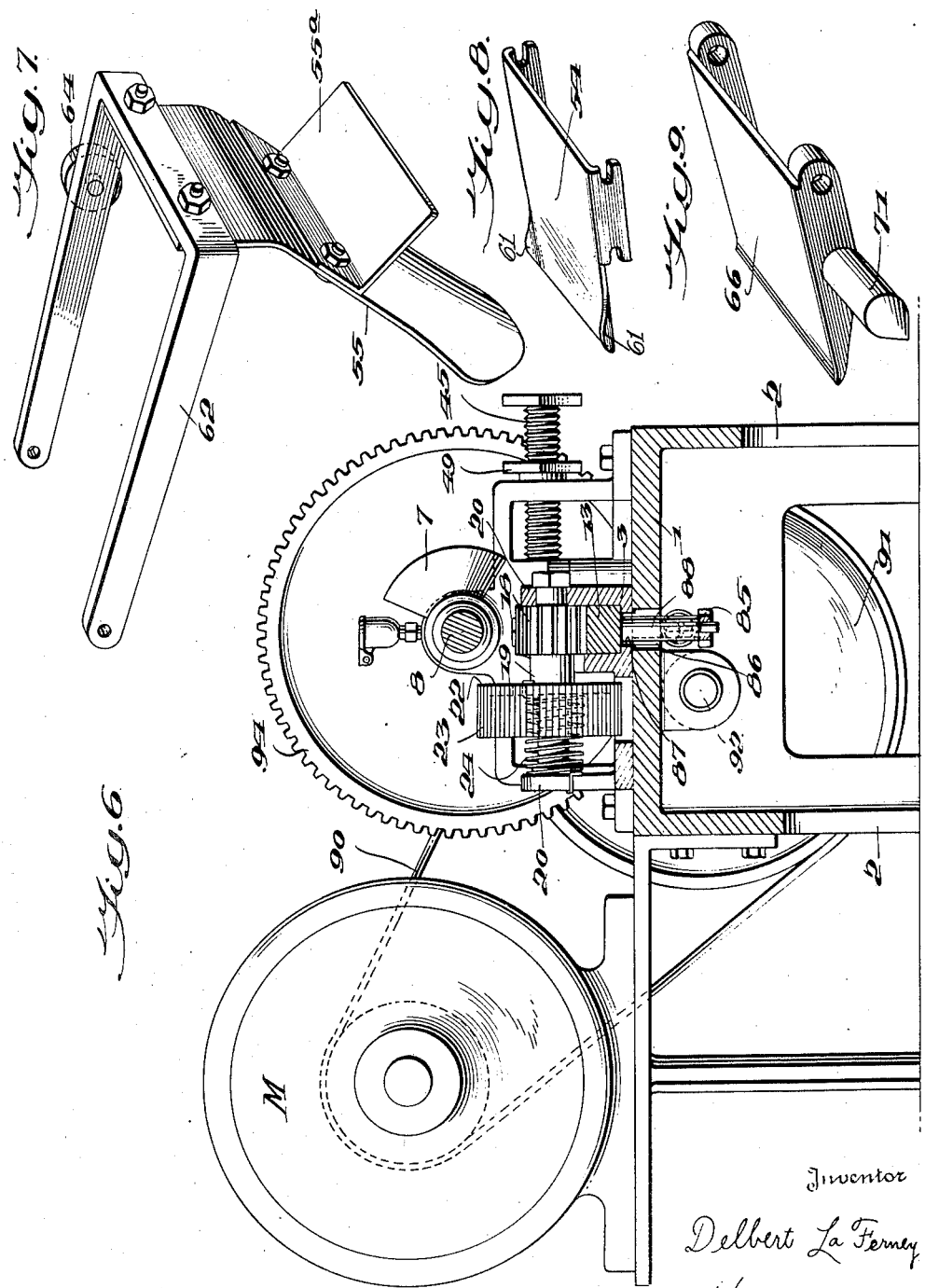

Patented Dec. 24, 1940

2,226,475

UNITED STATES PATENT OFFICE 2,226,475

NUT-CRACKING MACHINE

Delbert La Ferney, Little Rock, Ark., assignor to L. K. Maulsby, San Antonio, Tex.

Application May 18, 1938, Serial No. 208,680

6 Claims. (Cl. 146—12)

My invention relates to an improvement in nut-cracking machines.

One of the objects is to provide means for regulating the amount of crush of the nuts regardless of the size of the nuts.

Another object is to provide agitating means which catches the individual nuts as they are dropped from a hopper, the function of this agitating means being to place the nut infallibly in a lengthwise position ready to be dropped on a trap in readiness to be crushed.

Another object of this invention is to provide means for delivering a single nut at a time from the hopper containing the supply of nuts, and to so synchronize the mechanical parts of the machine as to feed the nut, insure the proper delivery of the nut in position in the path of the crushing mechanism to be cracked and discharged out of the machine in readiness to receive the next oncoming nut, whereupon the operation is repeated with precision with the feeding of each nut.

With the foregoing and other objects in view, the invention consists of two cones, one of which is movable, and between which cones the nuts are successively fed, one at a time, and means for insuring the proper disposition of the nuts between these cones with precision preparatory to the crushing operation.

It further consists in means for regulating the amount of crush to provide for the easy liberation of the means from the shells with the least possible injury of the meats. It further consists of an automatic feed of the nuts from the main hopper by the singling out of a single nut at a time, and thereafter dropping it into a trap where agitating means is in readiness to insure the proper endwise placement of one nut at a time in the path of the moving cone, in readiness to receive the required endwise crush.

The invention further consists in an endwise movable rack which carries one of the cones and is mounted to move in a movable carriage, one of which is movable with respect to the other until the nut is engaged, and both of which thereafter move together as a single unit during the crushing operation of the presented nut.

The invention also consists in the foregoing in connection with means for regulating the movement of the carriage to the exact amount of crush of the nut desired.

The invention further consists in mechanisms all assembled, co-ordinated and timed to perform these various operations to successfully accomplish the objectives of the machine.

In the accompanying drawings:

Fig. 1 is a top plan view,

Fig. 2 is a view in front elevation, that is to say looking from the side opposite the main supply hopper;

Fig. 3 is a vertical longitudinal section on the line 3—3 of Fig. 1;

Fig. 4 is a horizontal section on the line 4—4 of Fig. 2;

Fig. 6 is a transverse section on the line 6—6 of Fig. 1, looking in the direction of the arrows;

Fig. 7 is a detached view in perspective of the agitating-gate;

Figs. 8 and 9 are views of parts of the trap which receive the nut and holds it in proper position during the cracking operation, and thereafter expels the trapped nut into the discharge chute beneath;

Figure 5:
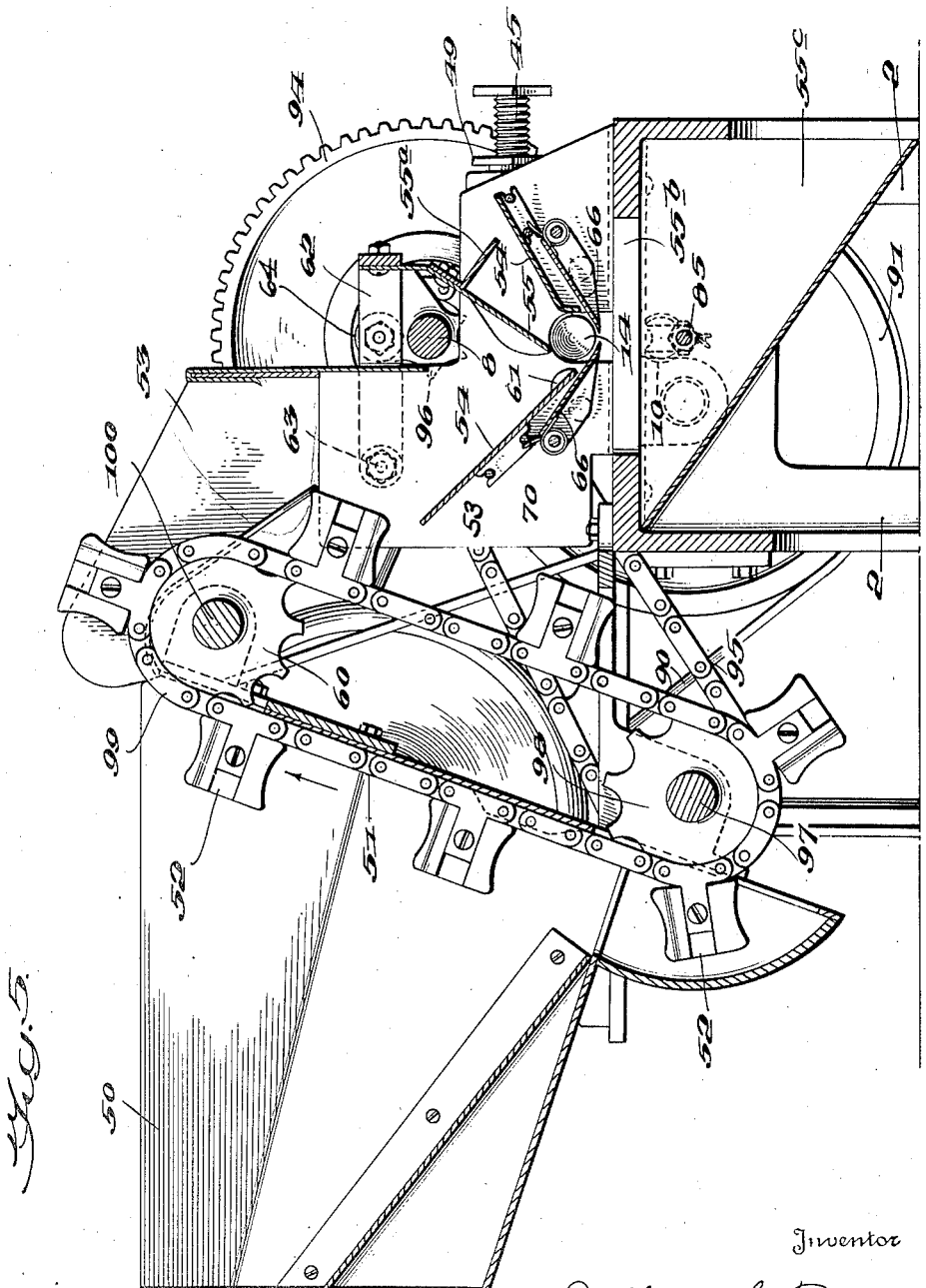
Fig. 5 is a transverse section on the line 5—5 of Fig. 2, looking in the direction of the arrows.

Figs. 10, 11 and 12 are detailed perspective views of three different cams employed in the operation; and Fig. 13 is a section on the lines 13—13 of Figs. 2 and 3, looking in the direction of the arrows.

The numeral 1 represents a base resting on suitable legs 2, and upon which base all the operative parts of the machine are mounted. The carriage 3 rests and is movable on the top of this base, one end fitting and being guided and held in place on the base in its reciprocating movements by the opening 4 in a pillow-block 5, as shown in Fig. 4, and the other end is confined in its movements on the base by a keeper 6, which bridges over the inner end of the carriage with its ends bolted to the base, so that the reciprocations of the carriage are confined to a straight longitudinal movement.

The carriage is moved forward by a cam 7 on the rotary shaft 8 turning against a truncated cone-shaped anti-friction roller 9 extending upwardly from the carriage in the path of this cam 7, which finds it in its pathway once with each revolution of the shaft. The carriage is moved in the opposite direction after the cam 7 has moved out of the way of the roller 9 by the spring 10, which is secured at one end to a stud 11 depending from the carriage 3 through the base 1, as shown in Fig. 3, and at the other end to the lug 12 on the inside one of the legs 2 of the base, and this spring exercises sufficient tension to retain the carriage in its extreme reverse position until it is again moved in the opposite position at a predetermined time by the transit of the cam 7 again across the surface of the roller 9.

A rack-bar 13 is carried by and slidably mounted and guided in its reciprocating movements by the carriage 3. At its inner end it is held down on the carriage by the keeper 6, as shown in Figs. 3 and 4. The inner end of this rack bar carries the movable cone 14, which thus is confined against lateral movement or vibration on all sides by the carriage 3 and the keeper 6.

At the same time, the inner end of the carriage is held down on and in sliding relation with the base by the bracket 15 which is bolted down to the base with one end projecting into a recess 16 extending longitudinally in one side of the rack bar 13, as shown in Figs. 2, 3 and 4. From this inner end of the bracket 15, an ejector rod 15a extends through a bore in the axial center of the cone, and is thus fixed in position at all times, regardless of the position of the cone. Thus with the cooperation of the keeper 6, bracket 15, and the carriage 3, the movement of the cone is unerring and prevented from axial vibration.

A pinion 18 is mounted on a stub-shaft 19 and is geared to the teeth of the rack. This stub-shaft 19 is journaled in bearings 20 rising from the carriage 3 (see Fig. 6). A hollow drum 22 having ratchet teeth 23 on its circumference is keyed securely to the stub-shaft 19, and a sturdy spring 24 is coiled around the shaft 19 and secured at one end to the drum and at the other end to some part of the carriage, as for example, one of the bearings 20, see Figs. 1, 4 and 6.

This spring 24 is tensioned and energy is thus stored therein as the rack bar is reversed or moved outwardly, due to the rotation of the pinion 18 and with it the drum 22 carrying the ratchet teeth 23, since one end of the spring is fast to the drum 22 and the other to some part of the carriage. The rack bar is moved to this reverse position carrying the cone 14 with it by the hollow cup-like cam 25 secured on the shaft 8 turning against the truncated cone-shaped anti-friction roller 26 rotatably mounted in its path on top of the rack 13. The rim of this cup-shaped cam has a cam action upon the roller 26, and with each rotation of the shaft 8 by the pressure of one of its sloping edges 27 turning against the roller 26 has the effect of moving the rack bar 13 backward, or in reverse position, thereby withdrawing the movable cone from the path of the oncoming nut in readiness for the forward stroke to crush the nut in the meantime dropped and correctly positioned in its forward pathway.

The straight portion 28 of this cup-shaped cam temporarily arrests further movement of the rack-bar 13 in the carriage 3 until the opposite sloping edge 29 of the cup-shaped cam 25 reaches the roller 26, and by reason of this sloping edge the cam proceeds to gradually retreat and get out of the way of the roller.

The stored energy in the spring 24 now spends itself to turn the stub-shaft 19 with its pinion 18 to force the rack bar forward and the cone against the nut, the strength of which latter is sufficient to stop the further forward movement of rack and cone. At this juncture the ratchet-toothed wheel functions. Two spring-actuated pivotally supported dogs 30 and 31 arranged side by side, and one loosely connected with the other, are normally in position to successively engage a tooth of the ratchet teeth 23 on the drum 22, immediately after the forward movement of cone 14 and the rack-bar 13 is arrested by the nut to be crushed. These dogs block the drum 22 and stub-shaft 19, and the cam 7 on the shaft 8 by riding over the surface of the roller 9 at this time causes the carriage, rack-bar, stub-shaft, pinion and drum thereon to move forward as a unit to cause the crushing or cracking of the nut. The dog 30 has a pin 32 which extends into a recess 33 in the dog 31, as shown in Figs. 1, 2, 3 and 4, and the dog 30 is connected by a link 34 with a rocker 35, and the rocker is pivoted on a post 36 upstanding from the base 1 and carries a truncated cone-shaped anti-friction roller 37, which is held against the cam surface on the back of the cup-shaped cam 25.

Springs 40 and 41, respectively (the former shown in dotted lines only in Figs. 1 and 4) exert pressure at all times on these dogs in a direction toward the ratchet teeth 23 of the drum 22, and the tension of one of these springs is sufficient to move the rocker 35 in the same direction at all times.

This has the effect of holding the roller 37 on the cam edge 38 of the cup-shaped cam 25, which latter extends around the major portion of this cam with a recess 43 therein which provides clearance and permits the roller 37 and rocker 35 to move in the direction of the drum 22 in response to the tension of one of the springs 40 or 41 or both, and it is during this period while the recess 43 is opposite this roller 37 that the dogs engage the ratchet teeth of the drum and the carriage, pinion, drum, stub-shaft and rack move together as a unit, it is repeated, due to the action of the cam 7 upon roller 9.

The extent of movement of the carriage is determined and regulated by the screw 45. This turns in threads in the pillow-block 5; the inner end of this screw has a cone 46, and this turns against the sloping end 47, projecting from the cap plate 48 on top of the carriage 3.

The spring 10 by constantly exerting outward pressure upon the carriage 3 holds this sloping surface 47 against the cone 46 of the screw 45, and thus the two have a cam action, and by turning the screw outwardly, the carriage is allowed a longer stroke, and turning the screw in or to the right its stroke is shorter. The effect of this is to change the relative adjustments between the rack bar and carriage, and in that way the amount of pressure on the nut is regulated and the extent of the crush is delicately determined.

In order to hold the screw in its adjusted position, a locking-nut 49 is provided, and this is screwed up tightly against the pillow-block 5, as shown in Fig. 4, thus insuring permanence of adjustment.

A hopper 50 is provided to receive the nuts to be cracked. This is mounted in any approved manner on the base of the machine, and a nut elevating endless chain 51 travels along the inner side of the hopper through an opening in the bottom and to the top thereof, and the chain is provided with buckets 52 secured thereto at predetermined intervals apart, and each bucket is adapted to hold a single nut only, separating it from the rest and elevating it to the high point over the sprocket-wheel 60 at the upper edge of the hopper; and as the bucket begins to turn over the sprocket wheel, it drops the nut into the spout 53 below, over the sloping bottom 54, where it is met by the oscillating gate 55, substantially as shown in Fig. 5. On the back of the agitating gate apron 55a is formed, the purpose of which is to prevent crushed shells from flying out over the outer sloping bottom 54. An opening 55b lets the cracked nuts through to an outlet chute 55c.

This agitating gate is shown in perspective in Fig. 7. It is preferably rounded on the lower end, and curved in cross-section to better fit it for the agitation of the nut. The lower end of the bottom 54 is provided with curved diagonally disposed lips 61 to adapt them also to the elliptical shape of the nuts. The special function of this sloping bottom 54 with its curved diagonally disposed lips 61 and the agitating gate is to manoeuver the nut into the proper position so that one end will be invariably received by the cone preparatory to the cracking of the nut.

In order to cause the gate to thus agitate the nut and right it to the most desirable position for cracking, the gate is attached to a bail 62, the ends of which straddle and are conveniently pivoted to the sides of the spout 53 by means of the pivot-pins 63. An anti-friction roller 64 is journaled on one side of the bail, and this rests by gravity on a cam 65 secured therebeneath on the shaft 8, where the agitating gate rests by gravity. See Figs. 1, 2, 3, 5, 7 and 13. This cam 65 is composite in outline, and has four points of substantially the same distance from the center of the shaft, and a fifth long point, with curvatures therebetween, and these various points cause the agitating gate to move with the required speed a limited distance up and down, to insure the advantageous placement of the nut.

Following the completion of this agitating process, the long point of the cam presents itself, and as it climbs this long end of the cam 65, the cam causes the lifting of the gate sufficiently high to let the nut fall through to the trap-doors 66 below, which doors have just closed in preparation to receive the properly positioned nut immediately in the path of the movable cone 14, which at this period is being held in waiting by the straight portion 28 of the cam 25, passing over the roller 26, following which as the sloping portion 29 of the cam reaches the roller 26, the cone proceeds to press the nut endwise between it and the fixed cone 67, until its further movement is stopped by the nut itself, whether it be a large or small nut, but while this action is taking place, another nut has been dropped from the topmost bucket into the chute, and between the bottom 54 and the agitating gate 55 in readiness to be dropped in proper position in front of the moving cone on its next return. So while one nut is being cracked, another nut is waiting, and they are discharged from the buckets, singly at timed intervals to preserve this regulated plan.

To return now to the trap doors, they are spring-actuated and pivotally mounted in the side plates 70. The studs having pointed tapering ends 71 project out laterally from the free end of these trap doors, through slots in the side plates 70. These pointed ends 71 of the trap-doors are directly in the path of the forward cam edges 73 of the block 74, which is slidably mounted on the base 1 where it is held in place against vibration by a keeper 75 at the outer end, and a guide-post 76 at the other end. A spring 77 normally forces this slide block 74 outwardly as shown in Fig. 3, at which time the trap-doors are closed, where they remain until the nut is crushed, but open immediately thereafter and as the movable cone recedes. This is accomplished by the enlarged portion 78 of the cam 79, which latter is secured on the outer end of the shaft 8, coming in contact with the roller 80 journaled on the slidably mounted block 74. This enlarged portion 78 of the cam forces the block 74 inwardly against the action of the spring 77, and by the wedging action of the sloping cam surfaces 73 against the pointed ends 71, it simultaneously forces the trap-doors apart and open against the action of the spring 81 which close them the moment the spring 77 forces the block 74 outwardly.

In order to vary the length of stroke of the block 74, a screw 82 having a conical end is adapted to turn in the thread in the hub of cam 79 and enter a conical recess 83, provided for it in the shaft 8. The purpose of this is to force the cam 79 inwardly toward the pillow-block between which and its hub a clearance space is left, and against the roller 80, whereby to impart a slight inward adjustment to the block 74, thereby varying the amount of opening of the trap-doors. By turning the screw 82 in the other direction, the spring 77 forces the block 74 outwardly, thus providing the opposite adjustment of the trap-doors.

The numeral 85 represents an ejector which is movable in and out of the fixed cone 67. This makes a U-turn at one end of the machine, and extends beneath the latter, as shown in dotted lines in Fig. 2 and in full lines in Fig. 3, to a point where it is connected by a stud 86 to the rack-bar 13, said stud depending from the rack-bar through superposed slots 87 and 88 in the carriage and base, respectively. Incidentally, this stud 86 has a secondary function which is to limit the forward movement of the rack-bar when the stud 86 reaches the forward or inner end of the slot 88.

The machine may be driven by any approved means and preferably by motor M, from which a belt 90 extends to a pulley 91 keyed to a short drive-shaft 92 located beneath the base, as shown in dotted lines in Fig. 2 and in full lines in Fig. 3. On this drive-shaft a small gear-wheel 93 is keyed, and this is geared to the larger gear-wheel 94, directly thereabove, and which large gear-wheel in turn is keyed to the outer end of shaft 8, so that shaft 8 is driven at a much slower speed than the drive-shaft 92.

Motion is transmitted from shaft 8 by a sprocket chain 95 extending over a sprocket-wheel 96 on shaft 8, and thence over a sprocket-wheel on the short stub-shaft 97 journaled beneath the hopper. Another sprocket-wheel 98 on this shaft 97 drives the sprocket-chain 99 which carries the buckets 52, over the sprocket-wheel 60 on a shaft 100 journaled at the upper inner edge of the hopper 50. A channel 101 is provided by the inwardly projecting flanges 102, which just allow space for the buckets to pass between them as they go over the top, and at the same time they do not afford sufficient space for nuts to drop through or jam the chain.

*Operation:* To briefly summarize the operation, parts of which have already been quite fully described, the nuts are placed in the hopper and the buckets are designed to receive a single nut, and upon reaching the highest point the nut is thrown from the bucket as it goes over the top into the chute below, at the bottom of which it is stopped by the agitating gate 55, and jiggled up and down several times to get it into the most favorable position for cracking.

By this time, the trap doors have come together below the agitating gate in readiness to receive a single nut, whereupon the long point of the cam 65 lifts the agitating gate out of the way of the nut, and immediately thereafter is restored to position to assist in catching the nut dropped by the next oncoming bucket; and, in the meantime, the cone 14 is moving forward and pushing the nut against the fixed cone 67, whereupon its further movement, along with the rack-bar to which it is attached, is arrested by the nut itself.

At this juncture, the clearance space 43 on the edge of the cup-shaped cam 25 has reached a point opposite the roller 37, whereupon the dogs 30 and 31 are freed to respond to the action of the springs 40 and 41, and to engage teeth of the ratchet-wheel, which has the effect of locking the rack-bar 13, pinion 18, shaft 19, drum 22, and dogs 30 and 31, and the carriage 3, all together as a single unit, whereupon the cam 7 reaches the roller 9 on the carriage, and the carriage carries all these parts forward with the result that the nut is crushed.

It is understood, of course, that the ejector rod running through the axial center of the movable cone 14 is fixed, and that the cone moves with respect to it, whereas the ejector 85 moves back and forth in the fixed cone 67, with the movement of the rack 13.

Motion is transmitted through the pulley 91 and the gears 93 and 94 to the shaft 8, and the shaft 8 carries cams 7, 25, 65 and 79. It also carries the sprocket-wheel 96 through which motion is transmitted to the sprocket chain which carries the buckets from the hopper to the chute.

I claim:

1. The combination of a chute, means for automatically feeding nuts individually thereinto at predetermined intervals, an oscillating gate cooperating with a part of the chute to position each nut individually fed thereinto, a trap located beneath the oscillating gate which automatically closes to receive the positioned nut temporarily held by the oscillating gate, and which automatically opens to discharge the cracked nut, the trap including two spring-actuated pivotally supported doors having outwardly projecting studs, having conical ends, a slidably mounted block fashioned to engage said conical ends and force them in opposite directions against the action of the springs to open the doors of the trap to release the cracked nut, and a rotary shaft having a cam thereon for moving the slidably mounted block in one direction.

2. The combination of a chute, means for automatically feeding nuts individually thereinto at predetermined intervals, an oscillating gate cooperating with a part of the chute to position each nut individually fed thereinto, a trap located beneath the oscillating gate which automatically closes to receive the positioned nut temporarily held by the oscillating gate, and which automatically opens to discharge the cracked nut, the trap including two spring-actuated pivotally supported doors having outwardly projecting studs, having conical ends, a slidably mounted block fashioned to engage said conical ends and force them in opposite directions against the action of the springs to open the doors of the trap to release the cracked nut, a spring for moving the block in one direction, and a rotary cam for moving it in the opposite direction.

3. The combination of feeding mechanism, nut-cracking mechanism, an oscillating gate, a trap including spring-actuated pivoted doors located beneath the oscillating gate in position to receive and hold the nut during the cracking operation, a slidably mounted block for opening and closing the trap, and adjustable means for regulating the extent of movement of the slidably mounted block.

4. The combination of a base, a carriage movable thereon, a rack bar in movable relation with the carriage and having a nut-cracking cone, means for feeding nuts individually into the path of the cone to be cracked at timed intervals, a shaft having cams thereon, a pinion rotatably supported in the carriage and geared with the teeth of the rack-bar, a drum concentric and movable with the pinion, a spring secured to the drum and to the carriage, and sleeved around the axis of the drum, the drum having ratchet-teeth on its circumference, a rocker, spring actuated pivoted dogs connected with the rocker, and in position to successively engage the ratchet teeth on the drum, a roller carried by the rocker in position to be engaged by one of the cams on the shaft and thereby move in one direction, a link connecting the rocker with the dogs, the springs of which pull the rocker in one direction, the cam having a recess therein whereby to permit the rocker to move in one direction to permit the dogs to engage the ratchet teeth, whereby to lock the carriage, rack-bar, pinion and drum together as a single unit, and a roller on the carriage in position to be engaged by one of the cams on the shaft, whereby to move said parts as a single unit to cause the forward movement of the cone, whereby to crush the nut.

5. The combination of a base, two cones, one of which is movable, means for feeding nuts singly between said cones and into the path of the movable cone, a carriage slidably mounted on the base, a rack-bar slidably mounted on the carriage, and to one end of which the movable cone is attached, mechanism for moving the rack and cone independently of the carriage until stopped by the pressure of the cone upon the nut, means set in motion by the arrest of the cone upon engaging the nut for locking the rack bar and carriage temporarily together, and means arranged thereafter to move the carriage and rack as a unit to exert the final crush upon the nut, said last-mentioned means including a rotary shaft having a cam thereon and an anti-friction roller carried by the carriage in the path of the cam in position to be engaged with each rotation of the shaft, whereby to move the carriage and the parts locked thereto as a unit.

6. The combination of a base, two cones, one at least of which is movable, means for feeding nuts singly between said cones and into the path of the movable cone, an intermittently movable carriage slidably mounted on the base, a toothed bar slidably mounted on the carriage, and to one end of which the movable cone is attached, mechanism for moving the toothed bar and cone independently of the carriage until stopped by the pressure of the movable cone upon the nut, means set in motion by the arrest of the movable cone upon engaging the nut for locking the toothed bar and carriage temporarily together, and means arranged thereafter to move the carriage and toothed bar as a unit to exert the final crush upon the nut, said last-mentioned means including a rotary shaft having a cam thereon, and anti-friction means carried by the carriage in the path of the cam, to be engaged with each rotation of the shaft, to move the carriage and the parts temporarily locked thereto as a unit.

DELBERT LA FERNEY.